(12) United States Patent
Hognaland

(10) Patent No.: US 10,696,478 B2
(45) Date of Patent: Jun. 30, 2020

(54) AUTOMATED STORAGE SYSTEM

(71) Applicant: Autostore Technology AS, Nedre Vats (NO)

(72) Inventor: Ingvar Hognaland, Nedre Vats (NO)

(73) Assignee: Autostore Technology AS, Nedre Vats (NO)

( * ) Notice: Subject to any disclaimer, the term of this patent is extended or adjusted under 35 U.S.C. 154(b) by 0 days.

(21) Appl. No.: 16/589,158

(22) Filed: Oct. 1, 2019

(65) Prior Publication Data

US 2020/0031640 A1 Jan. 30, 2020

Related U.S. Application Data

(63) Continuation of application No. 16/122,969, filed on Sep. 6, 2018, now Pat. No. 10,494,239, which is a
(Continued)

(30) Foreign Application Priority Data

Dec. 10, 2012 (NO) .................................. 20121488

(51) Int. Cl.
*B65G 1/04* (2006.01)
*G05B 19/418* (2006.01)
(Continued)

(52) U.S. Cl.
CPC ......... *B65G 1/0478* (2013.01); *B65G 1/0407* (2013.01); *B65G 1/0464* (2013.01);
(Continued)

(58) Field of Classification Search
CPC .......................... B65G 1/0464; B65G 1/0478
See application file for complete search history.

(56) References Cited

U.S. PATENT DOCUMENTS 4,088,232 A * 5/1978 Lilly .................... B65G 1/0464
294/65.5
4,265,582 A * 5/1981 Theobald ............. B65G 1/0485
414/279
(Continued)

FOREIGN PATENT DOCUMENTS

JP 10203647 A 8/1998
JP 10-299280 11/1998
(Continued)

*Primary Examiner* — Thomas Randazzo
(74) *Attorney, Agent, or Firm* — Christian D. Abel

(57) ABSTRACT

The present invention concerns an automated storage system and remotely operated vehicle or robot for picking up storage bins from a storage system. The inventive vehicle or robot comprises a vehicle body, which vehicle body further comprises a first section for storing vehicle driving means and a second section for receiving any storage bin stored in a storage column within the storage system, a vehicle lifting device which is at least indirectly connected to the vehicle body in order to lift the storage bin into the second section, a first set of vehicle rolling means connected to the vehicle body in order to allow movement of the vehicle along a first direction (X) within the storage system during use and a second set of vehicle rolling means connected to the vehicle body in order to allow movement of the vehicle along a second direction (Y) in the storage system during use. The second direction (Y) is oriented perpendicular to the first direction (X). The inventive vehicle is characterized in that the second section comprises a cavity arranged centrally within the vehicle body. This cavity has at least one bin receiving opening facing towards the underlying storage columns during use. In addition, at least one of the two sets of vehicle rolling means is arranged fully within the vehicle body.

24 Claims, 9 Drawing Sheets

Related U.S. Application Data continuation of application No. 15/818,791, filed on Nov. 21, 2017, now Pat. No. 10,093,525, which is a continuation of application No. 15/632,441, filed on Jun. 26, 2017, now Pat. No. 9,862,579, which is a continuation of application No. 15/411,301, filed on Jan. 20, 2017, now Pat. No. 9,856,082, which is a continuation of application No. 15/197,391, filed on Jun. 29, 2016, now Pat. No. 9,656,802, which is a continuation of application No. 14/650,757, filed as application No. PCT/EP2013/075671 on Dec. 5, 2013, now Pat. No. 9,422,108.

(51) Int. Cl.

| | |
|---|---|
| *B66F 9/06* | (2006.01) |
| *B66F 9/07* | (2006.01) |
| *G06Q 10/08* | (2012.01) |
| *B65G 1/06* | (2006.01) |
| *B65G 1/137* | (2006.01) |
| *G05D 1/00* | (2006.01) |
| *B65G 1/00* | (2006.01) |
| *G06K 17/00* | (2006.01) |
| *G06Q 10/00* | (2012.01) |

(52) U.S. Cl.
CPC ............... *B65G 1/06* (2013.01); *B65G 1/137* (2013.01); *B65G 1/1371* (2013.01); *B66F 9/06* (2013.01); *B66F 9/063* (2013.01); *B66F 9/07* (2013.01); *G05B 19/41895* (2013.01); *G05D 1/0022* (2013.01); *G06Q 10/08* (2013.01); *G06Q 10/087* (2013.01); *B65G 1/00* (2013.01); *G05D 2201/0216* (2013.01); *G06K 17/00* (2013.01); *G06Q 10/00* (2013.01)

(56) References Cited

U.S. PATENT DOCUMENTS

| | | | | |
|---|---|---|---|---|
| 6,654,662 | B1 * | 11/2003 | Hognaland | B65G 1/0464 700/214 |
| 8,628,289 | B1 * | 1/2014 | Benedict | B65G 1/0478 414/217 |
| 2003/0229416 | A1 * | 12/2003 | Tai | B65G 1/0414 700/213 |

FOREIGN PATENT DOCUMENTS

| | | | | |
|---|---|---|---|---|
| JP | 10299280 A | * | 11/1998 | ............... B65G 1/04 |
| KR | 10-0555037 | | 3/2006 | |
| WO | WO-2013167907 A1 | * | 11/2013 | ............. B65G 1/137 |

* cited by examiner

AUTOMATED STORAGE SYSTEM

CROSS REFERENCE TO RELATED APPLICATIONS

This application is a continuation under 35 U.S.C. § 120 of U.S. application Ser. No. 16/122969 filed Sep. 6, 2018, which is a continuation of United States application Ser. No. 15/818791 filed 21 Nov. 2017, which is a continuation of Ser. No. 15/632,441 filed 26 Jun. 2017, now U.S. Pat. No. 9,862,579, which is a continuation of U.S. application Ser. No. 15/411,301 filed 20 Jan. 2017, now U.S. Pat. No. 9,856,082, which is a continuation of application Ser. No. 15/197,391 filed 29 Jun. 2016, now U.S. Pat. No. 9,656,802, which is a continuation of application Ser. No. 14/650,757 filed 9 Jun. 2015, now U.S. Pat. No. 9,422,108, which a US National Stage of international application PCT/EP2013/075671 filed 5 Dec. 2013.

FIELD OF THE INVENTION

The present invention relates to a remotely operated vehicle for picking up storage bins from a storage system as defined in the preamble of claim 1.

The invention also relates to a storage system using the inventive vehicle.

A remotely operated vehicle for picking up storage bins from a storage system is known. A detailed description of a relevant prior art storage system is given in WO 98/49075. Further, details of a prior art vehicle being suitable for such a storage system is disclosed in Norwegian patent NO317366. More specifically the prior art storage system comprises a three dimensional storage grid containing storage bins that are stacked on top of each other to a certain height. The storage grid is normally constructed as aluminium columns interconnected by top rails. A number of remotely operated vehicles, or robots, are arranged on the top rails. Each vehicle is equipped with a lift for picking up, carrying, and placing bins that are stored inside the storage grid.

Such a prior art storage system art and prior art robot is illustrated in FIGS. 1 and 2, respectively. The storage system 3 comprises a robot 1 which is arranged to move on dedicated supporting rails 13 and to receive a storage bin 2 from a storage column 8 within a bin storing grid 15. The storage system 3 includes a plurality of such robots 1 and a dedicated bin lift device 50, the latter being arranged to receive a storage bin 2 from the robot 1 at the top level of the bin storing grid 15 and to convey the storage bin 2 down in a vertical direction to a delivery station 60.

However, the prior art robot 1 shown in both FIG. 1 and FIG. 2 suffers from several important disadvantageous during their operation. Firstly, the particular design of the robot prevents access to all off the available storage columns in the storage system. Furthermore, this particular design may cause an undesirable high torque during lifting and transportation of storage bins, thereby creating potential instability problems, as well as a clear limitation of the robots maximum handling weight. An additional disadvantage caused by the prior art robot design is the fact that only one particular bin and one particular bin height may be accepted for each type of robot in order to ensure adequate stability. Finally, the presence of an integrated yoke/overhang in the upper part of the section receiving the storage bin necessitates an undesired speed reduction at the final stage of the lifting process performed by the yoke suspended vehicle lifting device.

SUMMARY OF THE INVENTION

The object of the present invention is to solve, or at least substantially alleviate, the above-described disadvantageous, that is to provide a vehicle/robot with higher stability properties, higher maximum handling weights, a more effective use of available space during operation and a less time consuming lifting and transporting process of storage bins.

The above-identified objects are achieved by a remotely operated vehicle as defined in claim 1 and storage system as defined in claim 11. Further beneficial features are defined in the dependent claims.

In particular, the present invention concerns a remotely operated vehicle or robot for picking up storage bins from a storage system. The inventive vehicle or robot comprises a vehicle body, which vehicle body further comprises a first section for storing vehicle driving means and a second section for receiving any storage bin stored in a storage column within the storage system, a vehicle lifting device which is at least indirectly connected to the vehicle body in order to lift the storage bin into the second section, a first set of vehicle rolling means connected to the vehicle body in order to allow movement of the vehicle along a first direction (X) within the storage system during use and a second set of vehicle rolling means connected to the vehicle body in order to allow movement of the vehicle along a second direction (Y) in the storage system during use. The second direction (Y) is oriented perpendicular to the first direction (X).

The inventive vehicle is characterized in that the second section comprises a cavity arranged centrally within the vehicle body. This cavity has at least one bin receiving opening facing towards the underlying storage columns during use. In addition, at least one of the two sets of vehicle rolling means is arranged fully within the vehicle body.

In order to allow easy entrance of the storage bin into the central cavity, its volume should be larger than the largest storage bin intended to be picked from the storage system. Likewise, the cross sectional area of at least one of the at least one bin receiving opening should be larger than the cross sectional area of the storage bin walls oriented parallel to the cavity opening(s).

The vehicle may further comprise means for reversibly and selectively displacing either the first set of vehicle rolling means or the second vehicle rolling means away from an underlying vehicle support within the storage system during a change of vehicle direction between the first direction (X) and the second direction (Y).

Furthermore, in an embodiment the first section may be arranged relative to the second section in such a way that the cross section of the vehicle parallel to the underlying vehicle support deviates from a quadratic shape.

In a preferred embodiment the vehicle body covers less or equal to the lateral cross sectional area of one central storage column in the first direction (X) and covers the lateral cross sectional area of more than one central storage column in the second direction (Y) during use. In a more specific example the vehicle body extends beyond the lateral cross sectional area of the central storage column at both sides facing the second direction (Y), i.e. covering also some of the cross sectional areas of the adjacent storage columns extending in the second direction (Y). The degree of extension from the central storage column is preferably equal on both of these sides. Central storage column is defined as the storage column which is immediately below a robot when the latter has reached a position allowing pick-up of a storage bin.

In order to inter alia allow high vehicle stability both sets of vehicle rolling means is preferably arranged symmetrically around the cavity, for example near the lower corners of the vehicle. At least one, and most preferably both, set(s) of vehicle rolling means may comprise at least four wheels. Other embodiments such as the use two perpendicular oriented caterpillar belts may be envisaged. Furthermore, both sets have an exterior design matching a corresponding exterior design on supporting rails constituting the vehicle support in order to provide increased lateral stability when interconnected. Such supporting rails would be arranged in a two dimensional matrix on top of a bin storing structure or grid, where the principal directions of both the matrix and the grid are congruent with the vehicle's first direction (X) and second direction (Y).

The vehicle may advantageously also include position sensing means to allow measurements of the vehicle position within the storage system during use. This position sensing means may comprise a plurality of position sensors arranged in at least some of the positions on the vehicle body which would transverse the locations of vehicle support where the supporting rails are crossing, for example underneath the vehicle, close to its lower corners.

The present invention also concerns a storage system which comprises a remotely operated vehicle in accordance with the above mentioned features, a vehicle support comprising a plurality of supporting rails forming a two dimensional matrix of guiding meshes, wherein the vehicle support is configured to guide the movements of the vehicle in the first direction (X) and the second direction (Y) during use, a bin storing structure or grid supporting the vehicle support comprising a plurality of storage columns, wherein each of the storage columns is arranged to accommodate a vertical stack of storage bins and wherein the main part of the bin storing structure coincides with positions on the vehicle support where the supporting rails are crossing, and a bin lift device arranged to convey a vehicle delivered storage bin in a direction perpendicular to the lateral plane of the vehicle support between the vehicle support and a delivery station.

In a preferred embodiment at least some of the supporting rails arranged at the outer lateral border areas of the vehicle support form outer guiding meshes having reduced average cross sectional areas compared to the average cross sectional area of the remaining guiding meshes in the vehicle support. For example, the average reduced cross sectional areas of the outer guiding meshes may be about half of the average cross sectional area of the remaining guiding meshes in the vehicle support. In a particularly preferred embodiment these cross sectional areas of the outer guiding meshes are reduced only along the second direction (Y) of the vehicle support.

The central arrangement of the cavity in the vehicle body relative to the second direction (Y) effectively remove the undesired torque, thereby improving the stability of the robot or vehicle. This arrangement also results in a lifting and transporting process having a weight distribution with a high degree of symmetry. Furthermore, the novel design allows the same vehicle to be used for lifting and transporting storage bins of heights significantly less than the cavity height (i.e. the height extending from the suspension points of the lifting device and to the lower edge of the vehicle) since the framework/body surrounding at least part of the bin receiving cavity effectively hinders any undesired bin reeling/wobbling. The presence of the cavity surrounding body also allows maintaining full or nearly full lifting speed almost all the way to its end position within the cavity, as well as initiation of stable bin transportations towards the delivery station prior to a fully completed bin lifting from a storage column. The protective body around the cavity also gives the possibility of starting a descent of the lifting device event prior to the time the vehicle has come to a final halt above the storage column in question. A significantly higher stability and time efficiency is thus achieved.

By arranging at least one set of vehicle rolling means fully within the vehicle or robot body additional stability is obtained during the lifting process since the rolling means is situated closer to the storage bin to be lifted. Of the same reason this arrangement reduces the total load on the lifting device. Furthermore, the arrangement is more space efficient relative to the prior art robot illustrated in FIG. 2 since the roller means does not give any additional extensions in at least one of the two robots moving directions (X and Y). Production of smaller sized robots/vehicles is also rendered possible.

BRIEF DESCRIPTION OF THE DRAWINGS

These and other characteristics of the invention will be clear from the following description of a preferential form of embodiment, given as a non-restrictive example, with reference to the attached drawings wherein.

DETAILED DESCRIPTION OF THE INVENTION

Figure 1:
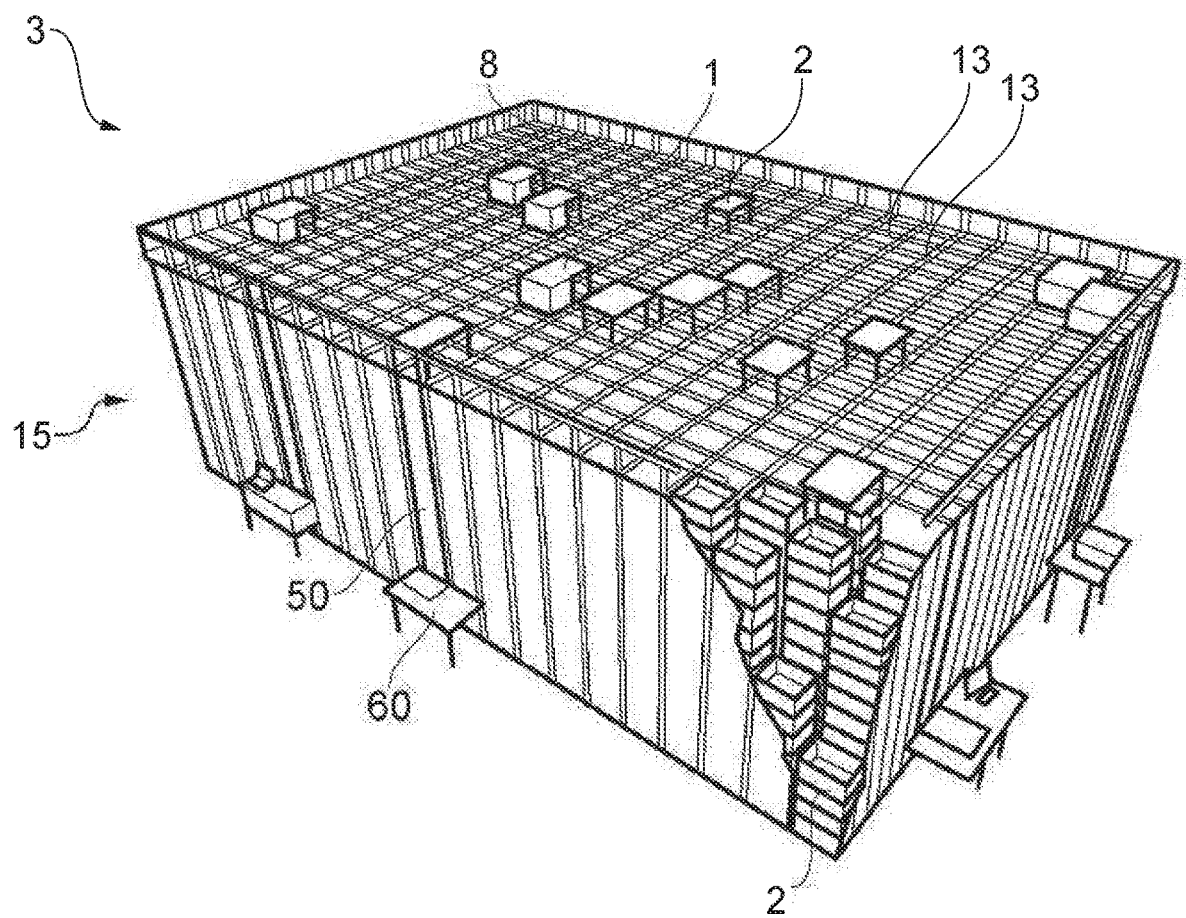
FIG. 1 is a perspective view of a prior art storage system.
Figure 2:
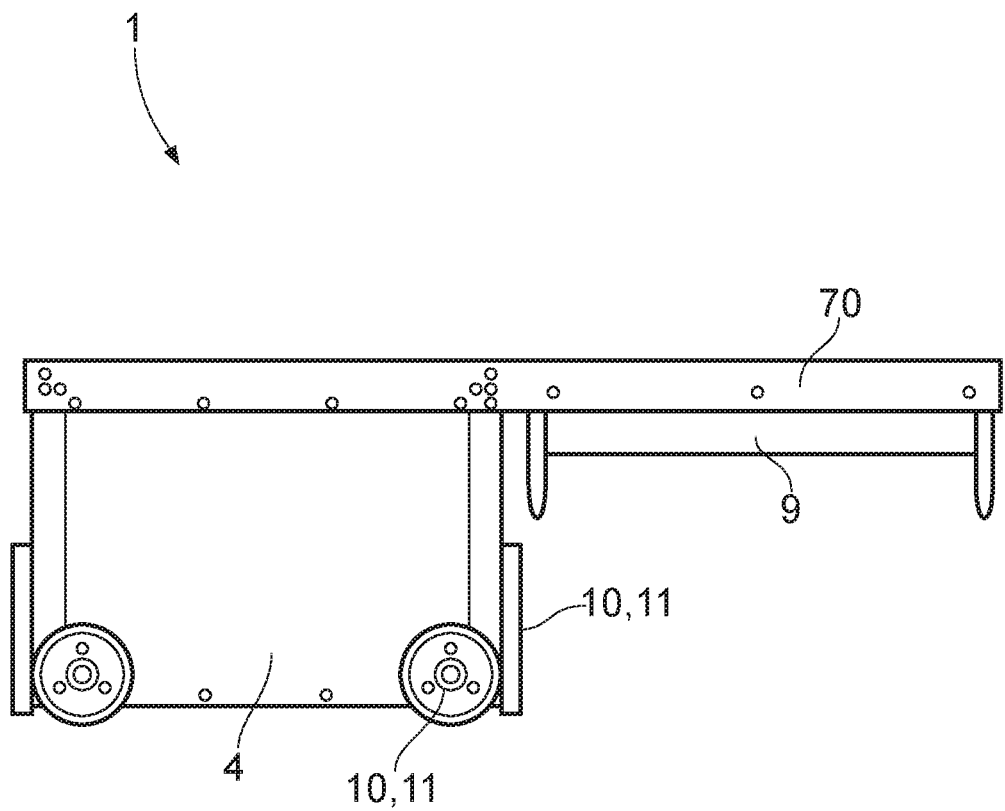
FIG. 2 is a sectional view of a prior art robot or vehicle forming part of a storage system as illustrated in FIG. 1.

FIG. 1 is a schematic, partly cut perspective view of a storage system according to the prior art, and FIG. 2 is a sectional view of a corresponding prior art robot. Both figures have already been referred to earlier in the text.

Figure 3:
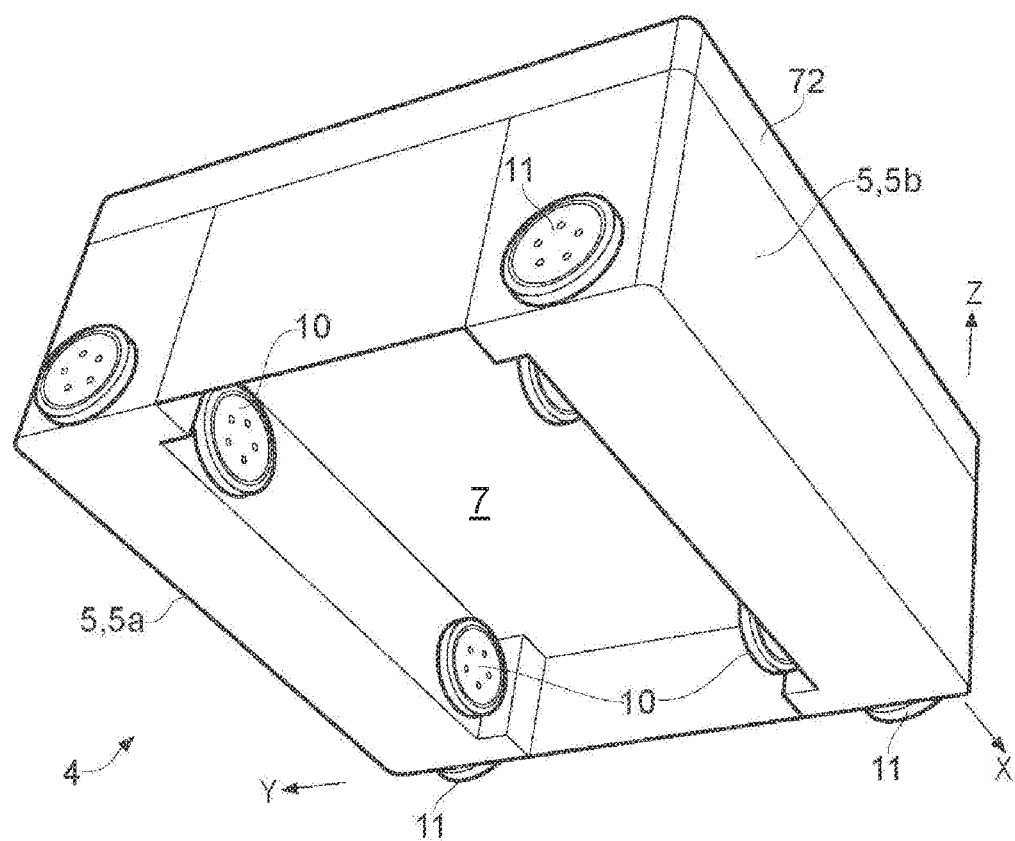
FIG. 3 is a perspective base view of a remotely operated vehicle according to the present invention.
Figure 4:
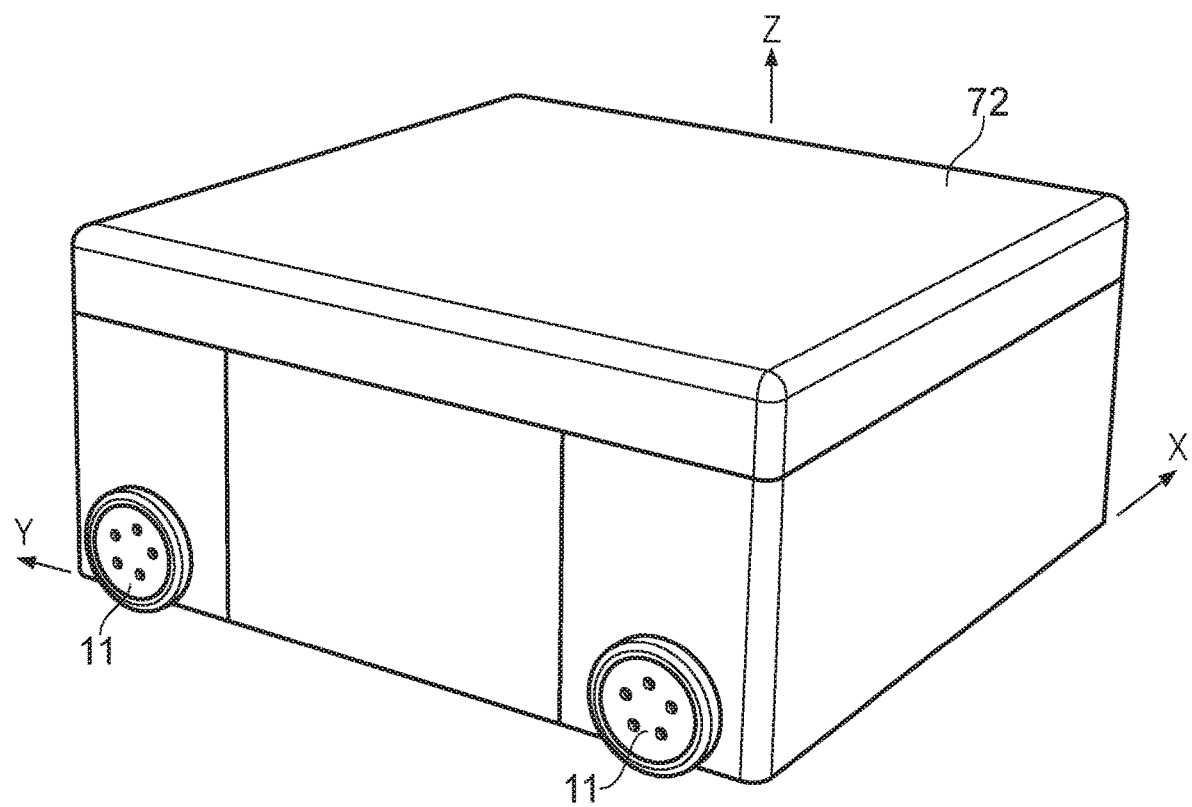
FIG. 4 is a perspective top view of a remotely operated vehicle according to the present invention.

FIGS. 3 and 4 gives a perspective view in two different angles of the inventive robot 1 comprising a rectangular vehicle body or framework 4 with a cavity 7 centrally arranged within the body 4, a top lid 72 covering the top part of the body 4, a first set of four wheels 10 mounted inside the cavity 7 and in parallel to the interior walls of the body 4 and a second set of four wheels 11 mounted in parallel to the exterior walls of the body 4. The first and second set of wheels 10,11 are oriented perpendicular to each other. Further, the vehicle body 4 also includes side parts 5,5a,5b arranged on both sides of the cavity 7 along at least one of the robots 1 direction of movements. For the sake of clarity a Cartesian coordinate system is shown with its X, Y and Z axes aligned along the principal directions of the rectangular vehicle body 4. The size of the cavity 7 is adapted to contain necessary component for a lifting device 9 and to at least completely contain the largest storage bin 2 intended to be picked up by the robot 1.

Figure 5:
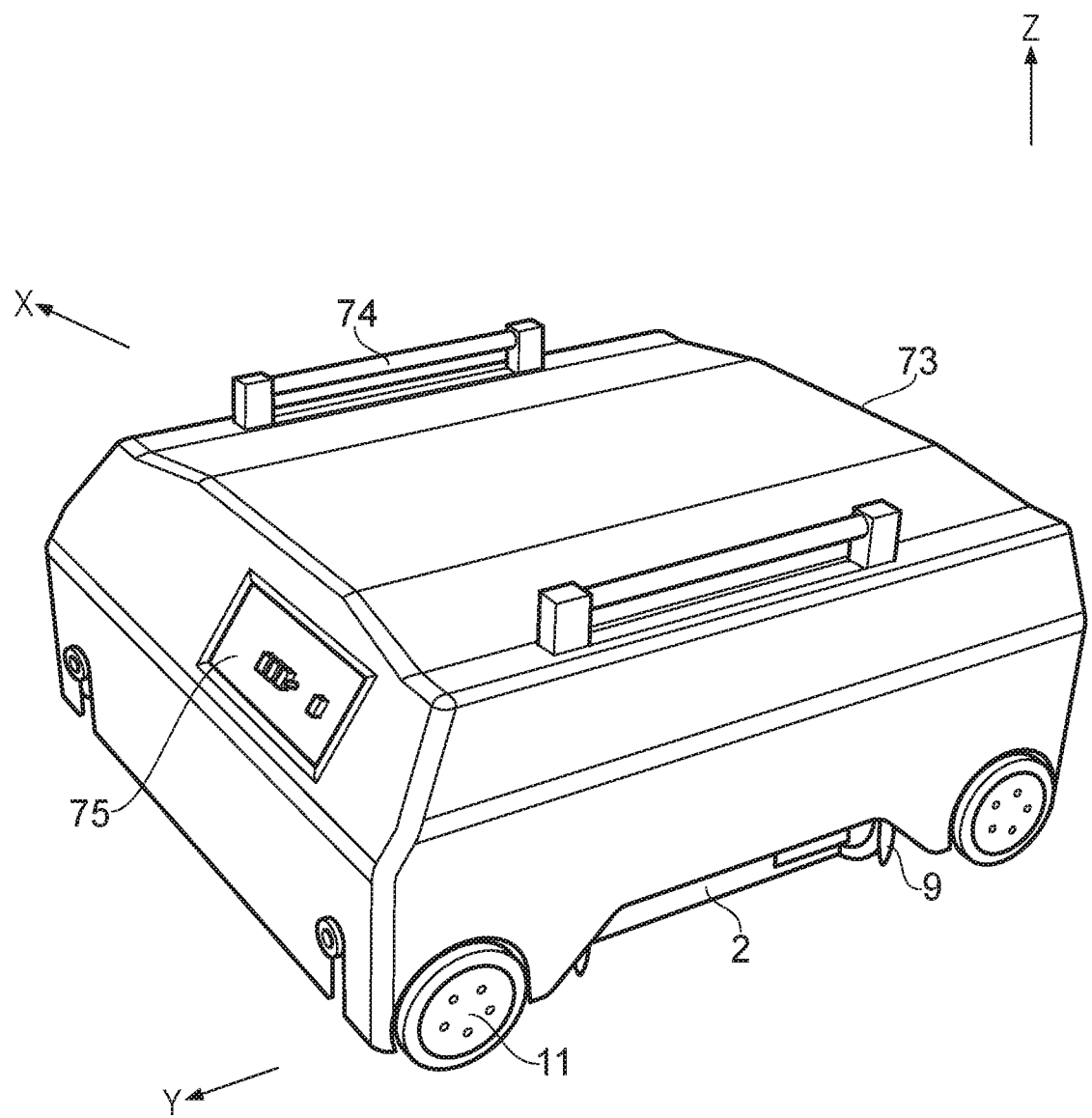
FIG. 5 is a perspective top view of a robot assembly comprising a remotely operated vehicle according to the present invention, a storage bin and a fully enclosing cover.

FIG. 5 gives a perspective view of a robot assembly where the body 4 is completely covered by an enclosing cover 73 comprising handles 74 and transmission means/control panel 75. The design of the enclosing cover 73 is adapted to the particular shape given by the body 4 and the protruding wheels 10. FIG. 5 also shows a small part of a storage bin 2 arranged fully inside the cavity 7 and a small part of the lifting device 9. The latter is preferably composed of inter alia four vertically moveable metal bands suspended on the cavity facing side of the top lid 72 in their upper ends and steering rods at the lower ends capable of being steered and fastened into adapted cavities/areas in the storage bin 2 to be picked.

Figure 6:
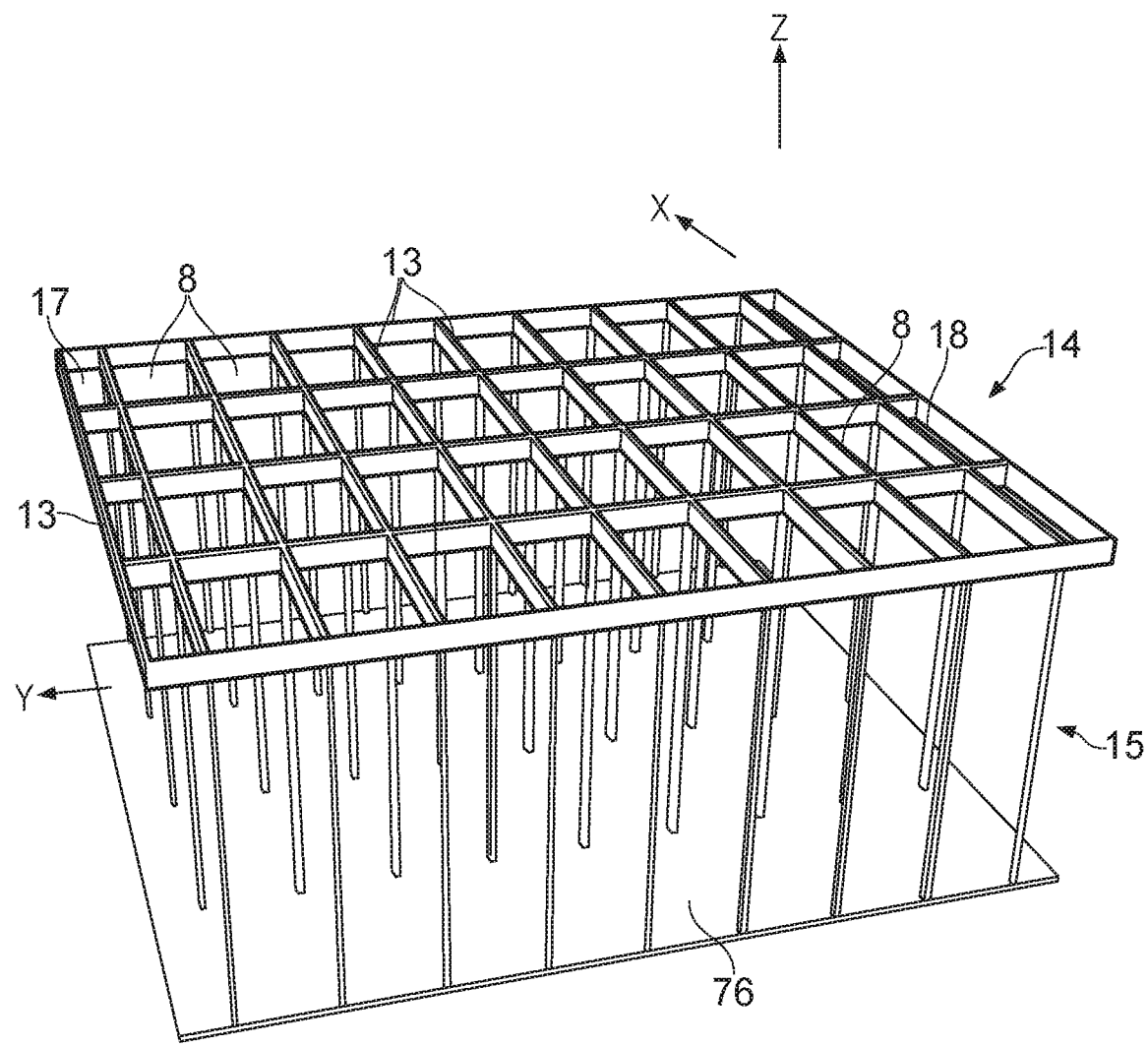
FIG. 6 is a perspective top view of a bin storing grid and a vehicle support in accordance with the present invention.
Figure 7:
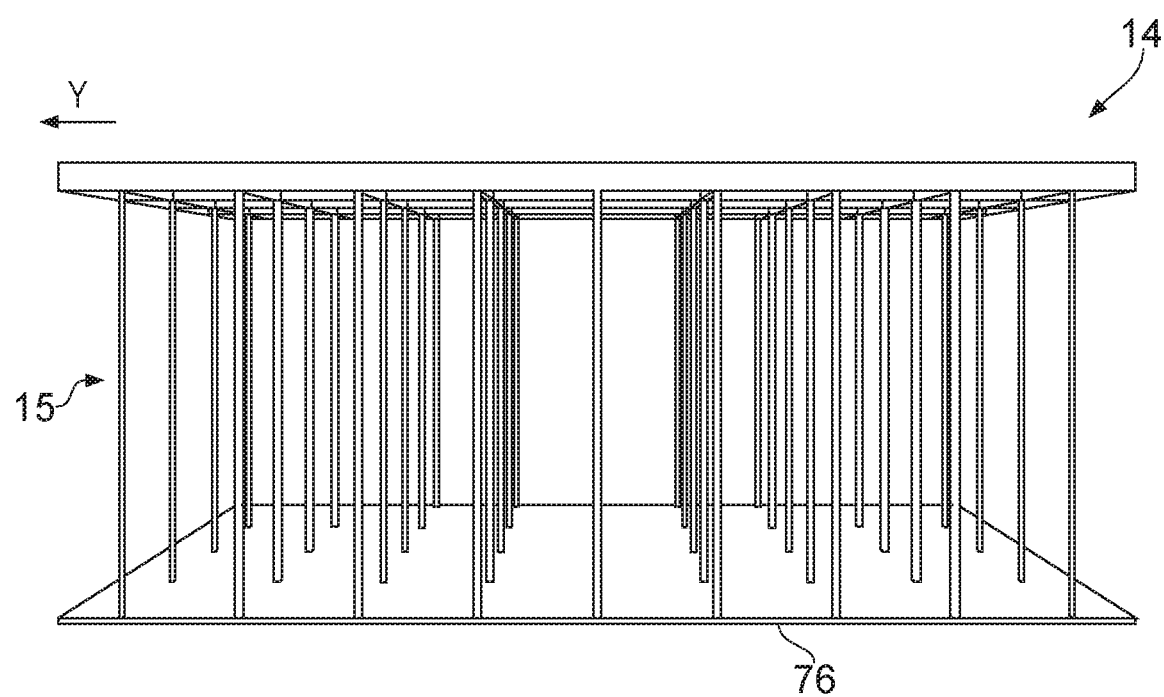
FIG. 7 is a perspective side view of a bin storing grid and a vehicle support in accordance with the present invention.

The structural principles of a grid assembly comprising a bin storing structure or grid 15, integrated supporting rails 13 constituting the vehicle support 14 and a grid supporting base 76 are illustrated in FIGS. 6 and 7. The grid 15 comprises a plurality of pillars being arranged with internal distances adapted to accommodate storage bins 2 to be stored in stacks inside the grid 15. The rectangular arrangements of four adjacent pillars therefore constitute a storage column 8. Both the pillars and the rails 13 may be made of Aluminium. As for FIGS. 3 and 4 a Cartesian coordinate system is shown aligned along the principal directions of the grid assembly to ease the understanding. The supporting rails 13 form a two dimensional matrix of rectangular meshes, and the cross sectional area of most of these meshes coincide with the cross sectional area of each storage columns 8 set up by the underlying grid 15. The meshes at the border area 17,18 of the vehicle support 14 (at both sides in direction Y) is illustrated with cross sectional areas smaller than the remaining meshes. The size of the border meshes 17,18 should preferably be adapted to the degree of extension beyond a central storage column 8a situated immediately below the cavity 7 of the robot 1 when the latter is in a position for initiating pick up of a storage bin 2 contained in the central storage column 8a (see FIGS. 8 and 9). In this way the robot 1 may reach all the storage columns 8 in the storage system 3, i.e. independently of the robot orientation in the Y direction. For example, if the robot 1 extends exactly over the cross sectional area of one central storage column 8a in the X direction and over ½ of the cross sectional area of the adjacent storage column 8b in the Y direction, the cross sectional area of the meshes 17,18 at the border area in the Y direction should be approximately ½ of the cross sectional area of the remaining meshes. The primary function of these border meshes 17,18 is thus to allow sufficient space for the robot 1 having the novel design.

Figure 8:
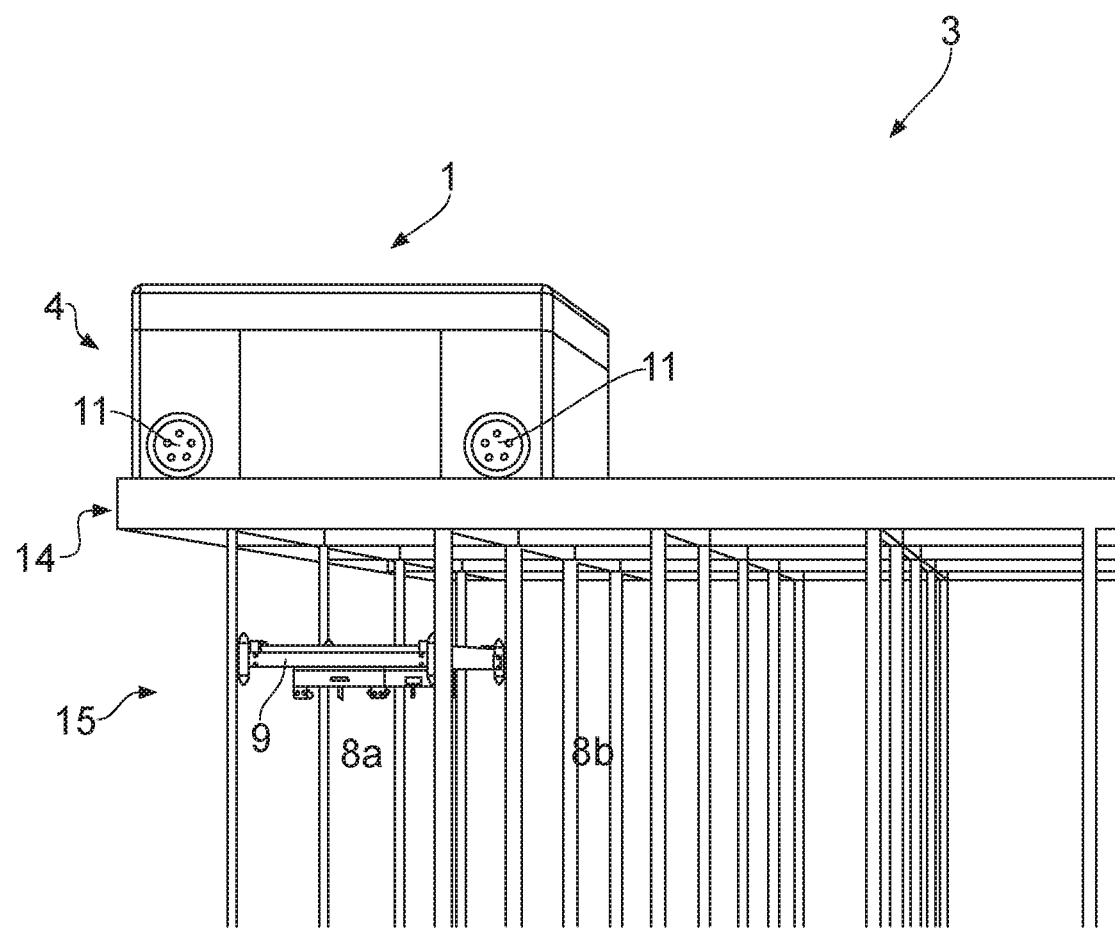
FIG. 8 is a perspective side view of part of a storage system in accordance with the present invention including a bin storing grid, a vehicle support and a remotely operated vehicle.

FIG. 8 shows the robot 1 in a lifting position above the central storage column 8a adjacent to the border area 17,18 of the grid assembly. The vehicle lifting device 9 is in this embodiment lowered a distance into the central storage column 8a in order to hook onto and lift up the underlying storage bin 2. As seen in the exemplary situation in FIGS. 8 the robot 1, having the body 4 extended in the Y direction compared to the X direction, may be driven all the way to the edge of the grid 15 when the border area is designed with additional border meshes 17,18 with a Y directional width approximately ½ of the Y directional widths of the remaining meshes in the grid 15.

Figure 9:
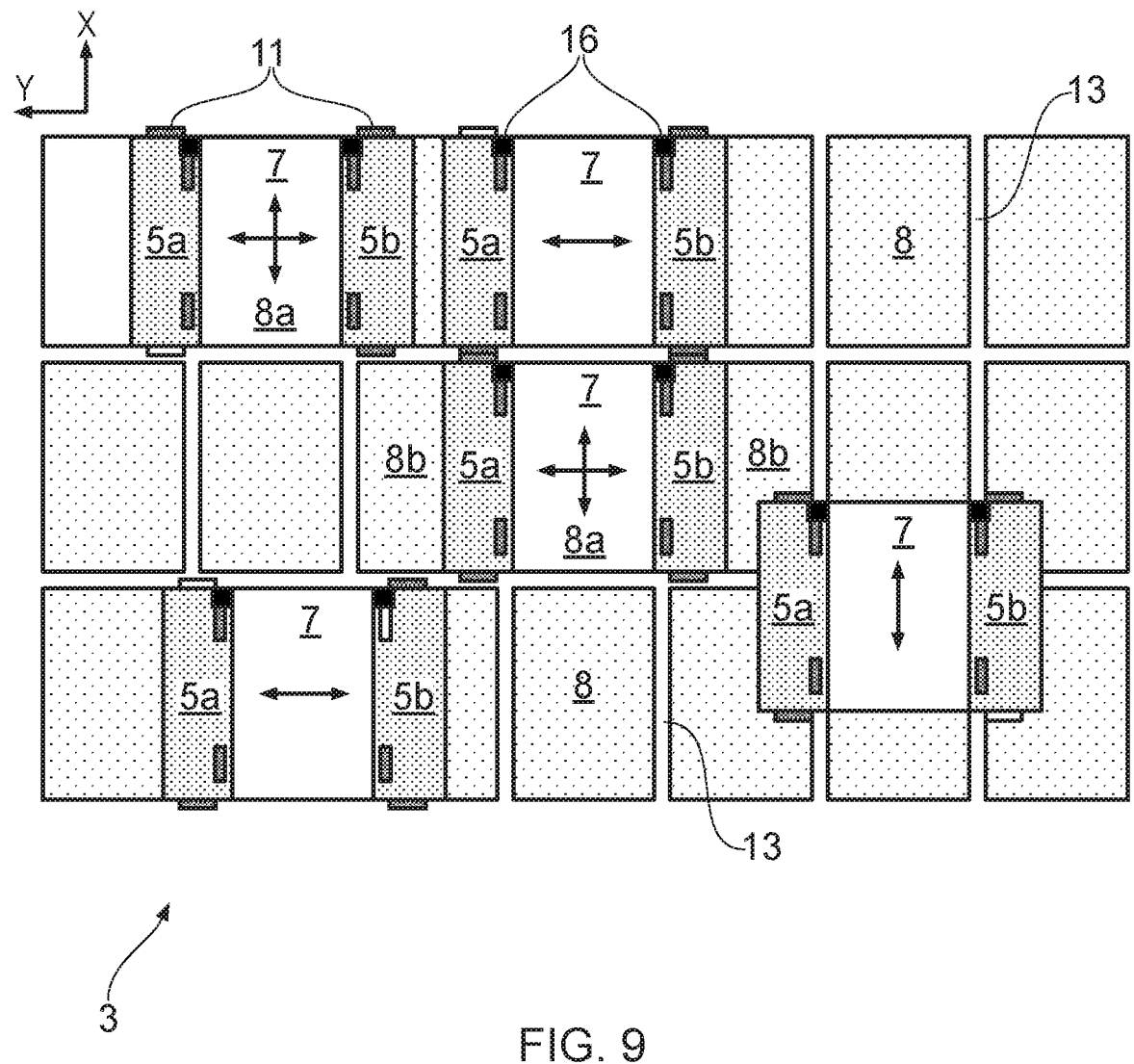
FIG. 9 is a schematic top view of a remotely operated vehicle moving on a two dimensional matrix of supporting rails.

To better illustrate the movement of the robot 1 on the supporting rails 13 constituting the vehicle support 14 some exemplary positions of robots 1 on a grid assembly is illustrated in FIG. 9. The thick arrows drawn in the centre of the robots 1 indicate allowed moving directions. When the robot 1 is situated with its cavity 7 exactly above a central storage column 8a, as is the case for the top left and mid centred robot 1, the arrangement of the supporting rails 13 allow movement in both X and Y directions. Any other positions on the grid assembly restrict the robot's 1 movement on the vehicle support 14 either in X direction (lower right robot 1) or in Y direction (top centered and bottom left robot 1). To allow determination of the robot position it is considered advantageous to equip each robot 1 with one or more position sensors 16, for example optical sensors. Such sensors should 16 preferably be mounted in one or more areas of the robot 1 which ensures that the sensors 16 have both non-obstructed view to the underlying supporting rails 13 and that they pass directly above or close to the positions on the vehicle support 14 in which the rails 13 are crossing. The readings from the sensors 16 may inter alia dictate the further movement of the robot 1 and/or the operation of the vehicle lifting device 9.

All operations of the robot 1 are controlled by wireless communication means 75 and remote control units. This includes control of the robot movement, the vehicle lifting device and the position measurements.

In the preceding description, various aspects of the apparatus according to the invention have been described with reference to the illustrative embodiment. For purposes of explanation, specific numbers, systems and configurations were set forth in order to provide a thorough understanding of the apparatus and its workings. However, this description is not intended to be construed in a limiting sense. Various modifications and variations of the illustrative embodiment, as well as other embodiments of the apparatus, which are apparent to persons skilled in the art to which the disclosed subject matter pertains, are deemed to lie within the scope of the present invention.

LIST OF REFERENCE NUMERALS/LETTERS

1 Remotely operated vehicle/robot
2 Storage bin
3 Storage system
4 Vehicle body/framework
5 First section (of vehicle body)/component section/side parts
  5a First section, left
  5b First section, right
6 Vehicle driving means/motor unit
7 Vehicle storage space/second part/cavity/centrally arranged cavity
8 Storage column
  8a Central storage column
  8b Adjacent storage column
9 Vehicle lifting device
10 First set of vehicle rolling means/First set of wheels
11 Second set of vehicle rolling means/Second set of wheels
12 Bin receiving opening
13 Supporting rail
14 Vehicle support
15 Bin storing structure/grid 16 Position sensing means/position sensor
17 Left outer lateral border area of vehicle support/left border mesh
18 Right outer lateral border area of vehicle support/right border mesh
50 Bin lift device
60 Delivery station/port
70 Yoke/overhang
72 Top lid
73 Enclosing cover
74 Handles
75 Transmission means/control panel/wireless communication means
76 Grid supporting base

The invention claimed is:

1. A method of operating a bin storage system comprising a plurality of storage columns for the storage of a plurality of vertically-stacked storage bins, and a plurality of robot vehicles for transporting storage bins on the bin storage system, wherein each of the plurality of robot vehicles comprises
   a vehicle body,
   a cavity arranged to receive a storage bin from a storage column,
   a plurality of rolling members attached to the vehicle body about the cavity,
   arranged for travelling in a first and second directions along the bin storage system,
   a lifting device arranged to lift a storage bin from the storage column to an end position within the cavity; and
   wherein the method comprises the steps of:
      positioning the cavity of one of the plurality of robot vehicles above one of the storage columns,
      descending the lifting device of the robot vehicle into the storage column, lifting the lifting device of the robot vehicle from the storage column,
      using the plurality of rolling members of the robot vehicle, moving the robot vehicle along the bin storage system prior to the lifting device comes to the end position within the cavity.

2. The method according to claim 1, further comprises the step of: when positioning the cavity of one of the plurality of robot vehicles above one of the storage columns, initiating the descent of the lifting device prior to the robot vehicle comes to a halt above the storage column.

3. The method according to claim 1, wherein the step of lifting the lifting device of the robot vehicle further comprises lifting a storage bin with the lifting device from the storage column.

4. The method according to claim 2, wherein the step of descending the lifting device of the robot vehicle further comprises descending a storage bin with the lifting device into the storage column.

5. The method according to claim 1, further wherein the height of the lifted storage bin is significantly less than the height extending from suspension points of the lifting device to the lower edge of the robot vehicle.

6. The method according to claim 1, wherein the cavity is centrally arranged in the robot vehicle.

7. The method according to claim 1, wherein the plurality of rolling members is arranged symmetrically about the cavity.

8. The method according to claim 1, wherein the bin storage system comprises:

a. three-dimensional storage structure comprising
   a plurality of pillars which are positioned with internal distances and in a rectangular arrangement, wherein the rectangular arrangement of the pillars define the storage columns for the storage of a plurality of vertically-stacked storage bins,
b. supporting rails arranged in a two-dimensional matrix on the pillars, said supporting rails arranged in a first direction and a second direction orthogonal to the first direction, the supporting rails further defining openings for the storage columns.

9. The method according to claim 8, wherein the supporting rails defines rolling tracks, and the plurality of rolling members of the vehicle body is arranged for travelling along the rolling tracks.

10. A robot vehicle for transporting storage bins in a bin storage system, comprising
   a. a vehicle body,
   b. a cavity arranged to receive a storage bin from a storage column,
   c. a plurality of rolling members attached to the vehicle body about the cavity, arranged for travelling in a first and second direction along the bin storage system,
   d. a lifting device arranged to lift a storage bin from the storage column to an end position within the cavity; and
wherein the plurality of rolling members is arranged to move the robot vehicle along the bin storage system prior to the lifting device comes to the end position within the cavity.

11. The robot vehicle according to claim 10, wherein the lifting device is arranged to initiate descent prior to the robot vehicle comes to a halt above a storage column.

12. The robot vehicle according to claim 11, wherein the lifting device is arranged to descend to engage a storage bin.

13. The robot vehicle according to claim 11, wherein the lifting device is arranged to descend a storage bin into the storage column.

14. The robot vehicle according to claim 10, wherein the height of the lifted storage bin is significantly less than the height extending from suspension points of the lifting device to the lower edge of the robot vehicle.

15. The robot vehicle according to claim 10, wherein the cavity is centrally arranged in the robot vehicle.

16. The robot vehicle according to claim 10, wherein the plurality of rolling members is arranged symmetrically about the cavity.

17. The robot vehicle according to claim 10, wherein the bin storage system comprises:
   a. three-dimensional storage structure comprising
      a plurality of pillars which are positioned with internal distances and in a rectangular arrangement, wherein the rectangular arrangement of the pillars define the storage columns for the storage of a plurality of vertically-stacked storage bins,
   b. supporting rails arranged in a two-dimensional matrix on the pillars, said supporting rails arranged in a first direction and a second direction orthogonal to the first direction, the supporting rails further defining openings for the storage columns.

18. The robot vehicle according to claim 17, wherein the plurality of rolling members of the vehicle body is arranged for travelling along a plurality of rolling tracks of the bin storage system, and the supporting rails defines the rolling tracks.

19. An automated storage system, comprising
   a. a three-dimensional storage structure, comprising
      i. a plurality of pillars which are positioned with internal distances and in a rectangular arrangement, wherein the rectangular arrangement of the pillars define storage columns for the storage of a plurality of vertically-stacked storage bins,
ii. supporting rails arranged in a two-dimensional matrix on the pillars, said supporting rails arranged in a first direction and a second direction orthogonal to the first direction, the supporting rails defining openings for the storage columns,
b. a plurality of remotely controlled robot vehicles, said robot vehicles comprising
i. a vehicle body,
ii. a cavity arranged to receive a storage bin from a storage column,
iii. a plurality of rolling members attached to the vehicle body about the cavity, arranged for travelling along the storage structure in the first and second directions,
whereby the robot vehicle can move along the storage structure to position the cavity within the cross-sectional area of the storage column to receive the storage bin into the cavity for further transport along the storage structure.

20. The automated storage system according to claim 14, wherein the supporting rails defines rolling tracks, and the plurality of rolling members of the vehicle body is arranged for travelling along the rolling tracks.

21. The automated storage system according to claim 19, wherein the robot vehicles further comprise a lifting device arranged to lift a storage bin from the storage column to an end position within the cavity, and
the robot vehicle is moving along the bin storage system prior to the lifting device comes to its end position within the cavity.

22. The automated storage system according to claim 21, wherein the lifting device is arranged to initiate descent to engage a storage bin prior to the robot vehicle comes to a halt above the storage column.

23. The automated storage system according to claim 21, wherein the lifting device is arranged to initiate descent of a storage bin with the lifting device into the storage column prior to the robot vehicle comes to a halt above the storage column.

24. The automated storage system according to claim 21, wherein a height of the storage bin is significantly less than the height extending from suspension points of the lifting device to the lower edge of the vehicle.

* * * * *